June 6, 1961 W. S. PRAEG 2,986,851
GEAR FINISHING MACHINE
Filed Dec. 3, 1956 3 Sheets-Sheet 1
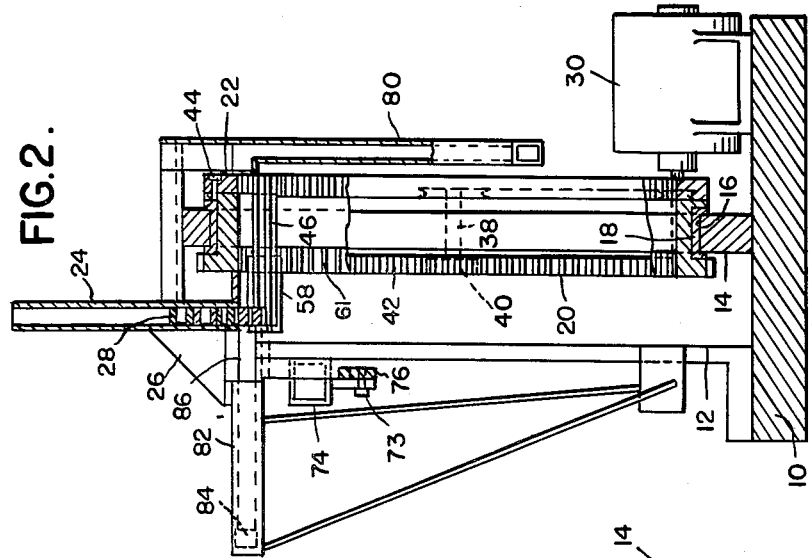
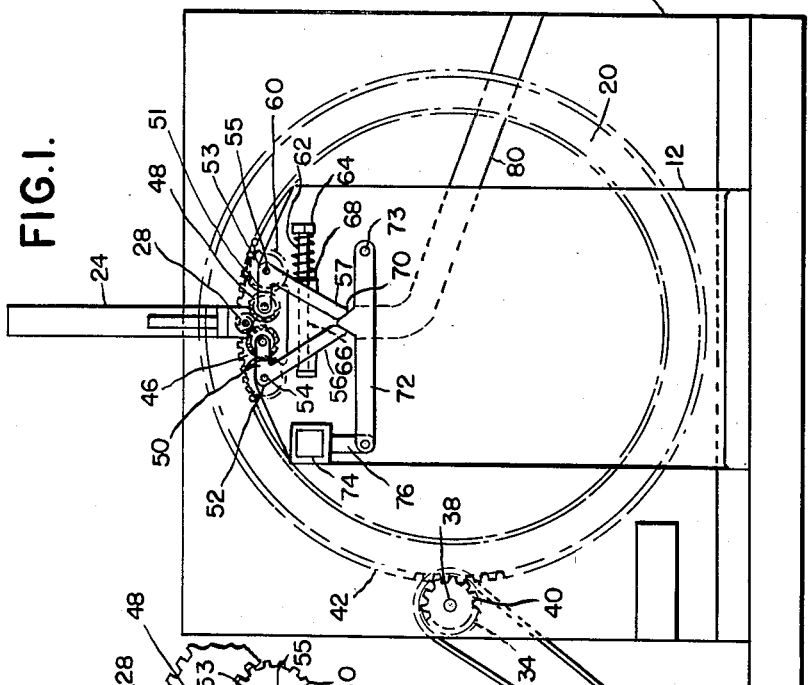
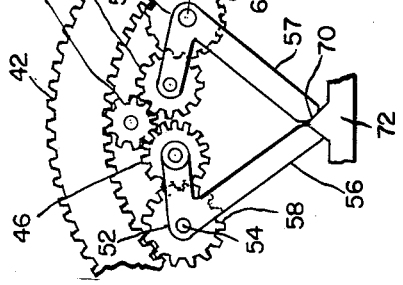
INVENTOR.
WALTER S. PRAEG
BY Whittemore
Hulbert & Belknap
ATTORNEYS

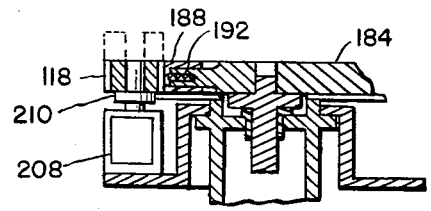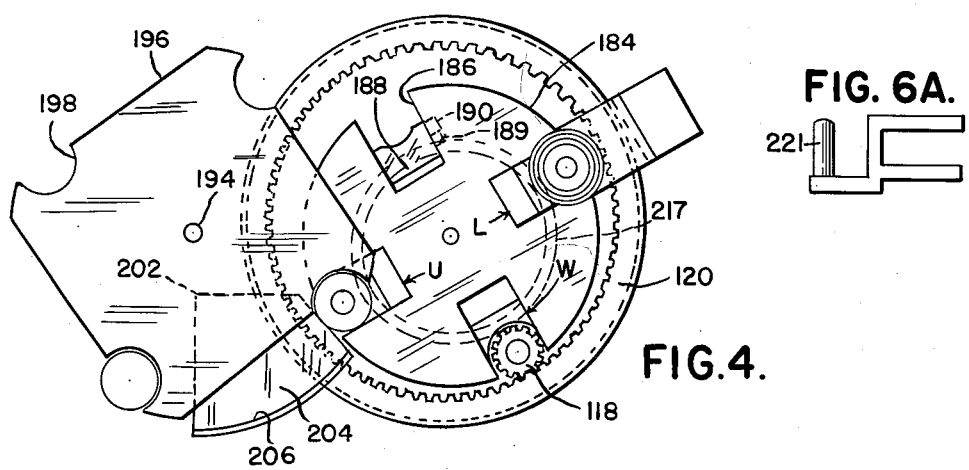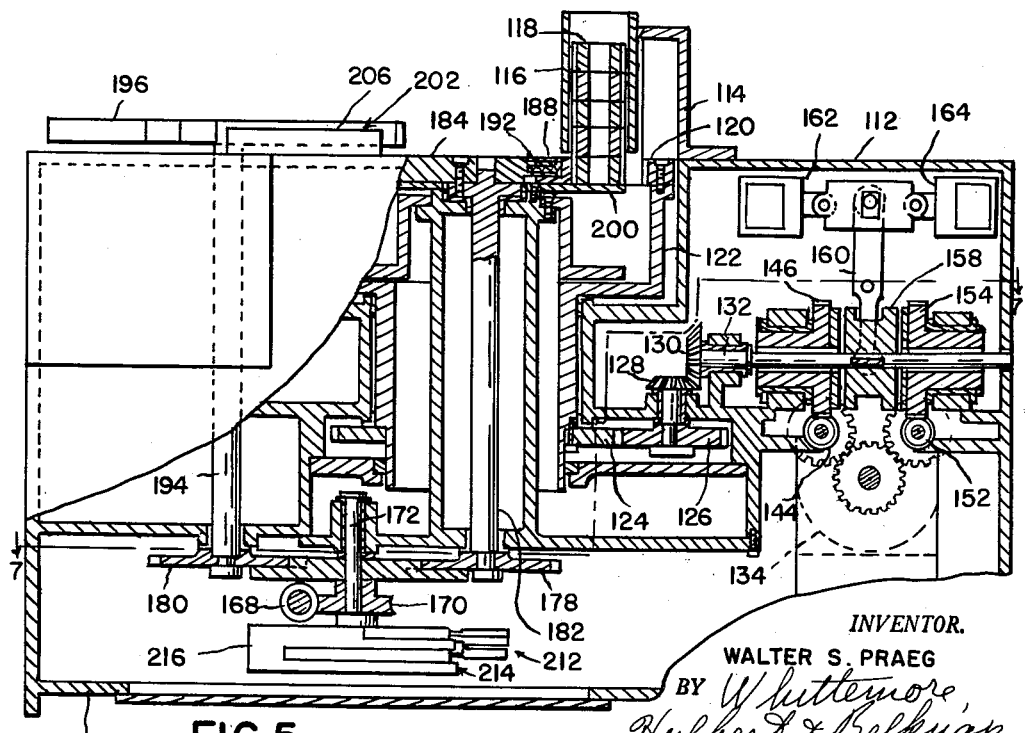

June 6, 1961 W. S. PRAEG 2,986,851
GEAR FINISHING MACHINE
Filed Dec. 3, 1956 3 Sheets-Sheet 3

INVENTOR.
WALTER S. PRAEG
BY Whittemore,
Hulbert & Belknap
ATTORNEYS

United States Patent Office 2,986,851
Patented June 6, 1961

2,986,851
GEAR FINISHING MACHINE
Walter Samuel Praeg, Detroit, Mich., assignor to National Broach & Machine Company, Detroit, Mich., a corporation of Michigan
Filed Dec. 3, 1956, Ser. No. 625,994
21 Claims. (Cl. 51—73)

The present invention relates to a gear finishing machine.

It is an object of the present invention to provide an automatically operable gear finishing machine in which gears are supplied to the machine from a supply chute and after the finishing operation are removed therefrom by a discharge chute.

More specifically, it is an object of the present invention to provide a gear finishing machine including a tool in the form of a relatively large internally toothed gear including means for moving a series of gears automatically into meshed relation with the teeth of the tool, for rotating the gear and tool in mesh with the teeth thereof under pressure contact to finish the teeth of the gear, and means for thereafter withdrawing the finished gear from meshed engagement with the tool and discharging it from the machine.

More specifically, it is an object of the present invention to provide a machine for finishing gears including an internally toothed gear-like tool, a pair of elongated guide gears disposed parallel to each other and extending through the opening in the tool, means for driving the tool and guide gears in timed relation, and means for pushing a work gear placed on a laterally extending portion of the two guide gears along the guide gears into meshed relation with the tool.

Still more specifically, it is an object of the present invention to provide automatic apparatus for effecting proper meshed engagement between a work gear and an internally toothed gear-like tool.

It is a further object of the present invention to provide a gear finishing machine including an enlarged internally toothed gear-like tool, a rotatable gear support mounted eccentrically within said tool, a plurality of carriers on said gear support movable generally radially thereon toward and away from the adjacent toothed portion of the tool, means for driving the tool in rotation, means for indexing the gear support to advance a carrier from loading position to working position, to unloading position, and back to loading position.

Other objects and features of the invention will become apparent as the description proceeds, especially when taken in conjunction with the accompanying drawings, illustrating preferred embodiments of the invention, wherein:

FIGURE 1 is a diagrammatic elevational view of gear finishing apparatus.

FIGURE 2 is a side elevational view, partly in section, of the apparatus shown in FIGURE 1.

FIGURE 3 is an enlarged fragmentary view of the mechanism shown in FIGURE 1.

FIGURE 4 is a plan view of another embodiment of gear finishing apparatus.

FIGURE 5 is an elevational view, partly in section, of the apparatus shown in FIGURE 4.

FIGURE 6 is a fragmentary sectional view of structure employed in the apparatus shown in FIGURES 4 and 5.

FIGURE 6A is a fragmentary side elevational view showing a modified element which may be employed in the structure illustrated in FIGURES 4–6.

Figure 7:
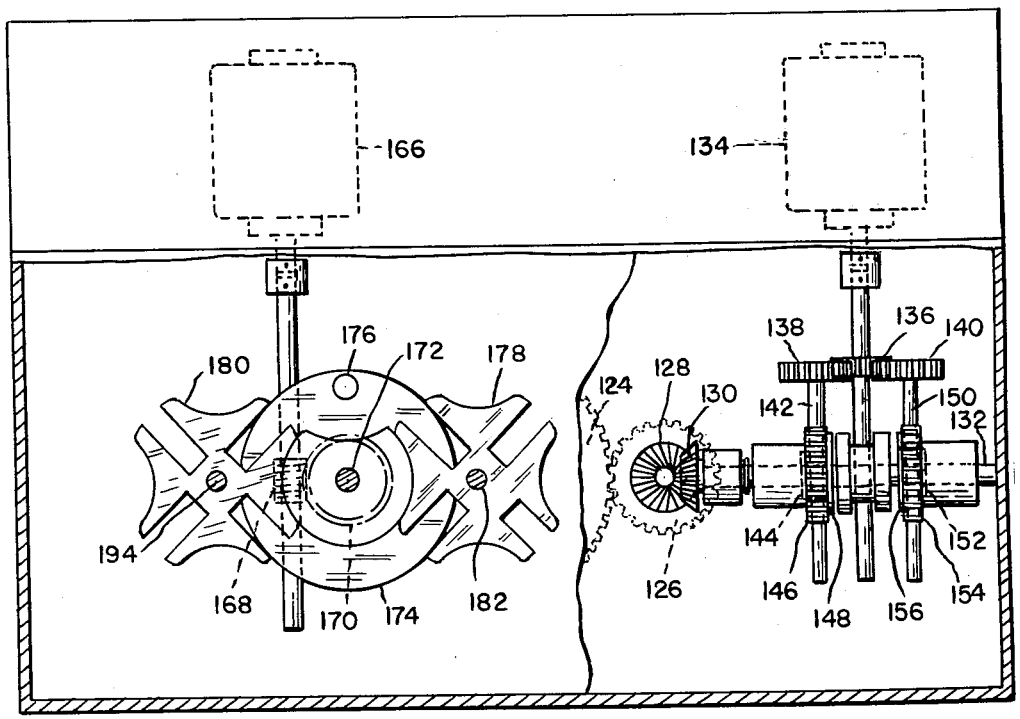
FIGURE 7 is a fragmentary sectional view taken substantially on the line 7—7, FIGURE 5.

Referring first to FIGURES 1 and 2, there is shown apparatus comprising a frame made up of a base 10 having first and second plates 12 and 14 secured thereto. The plate 14 is provided with an enlarged circular opening 16 in which is received a bearing 18 which provides a bearing for an annular mounting member 20 to which is fixedly secured an annular gear finishing tool 22 in the form of an internal gear-like member.

The operation intended to be performed by this apparatus is a gear honing operation for removing imperfections in and improving the teeth of gears, preferably hardened steel gears. Accordingly, the material of at least the surface portions of the teeth of the tool 22 are of a hard but resiliently yieldable plastic material, such as an epoxy resin, having embedded therein and exposed to the surface thereof a multiplicity of abrasive particles. A tool of this nature is more specifically disclosed in prior copending application Serial No. 543,704, filed October 31, 1955, now abandoned.

The present apparatus is intended to operate in a fully automatic manner to finish a series of gears without requiring the attention of an operator. Accordingly, a supply system is provided including as the terminal portion thereof a chute 24 extending vertically from the mounting plate 12 and connected thereto by a gusset plate 26. The supply chute is adapted to receive a plurality of work gears 28.

Means are provided for effecting continuous rotation of the gear-like honing tool 22. The means for effecting this comprises a motor 30 connected to a pulley 32 driving a pulley 34 through a belt 36. The pulley 34 is connected to a shaft 38 carrying a driving pinion 40 engageable with the peripheral external toothed portion 42 of the mounting member 20. Inasmuch as the annular honing tool 22 is bolted as indicated at 44 to the mounting member 20, the tool is driven in continuous rotation. If desired, suitable means may be provided for effecting periodic reversal of rotation of the motor 30 so as to reverse the direction of rotation of the honing tool 22 to provide uniform finishing action at opposite sides of the teeth of the work gears.

The problem of automatically advancing work gears into properly meshed relation with a gear-like finishing tool has always presented difficulties. In the present case the meshing engagement between the gears 28 and the tool 22 is brought about in a unique manner. Associated with the internal gear-like tool 22 are a plurality of elongated guide gears 46 and 48. As best seen in FIGURE 1, these gears are mounted at the ends of short arms 50 and 51 respectively of bell cranks 52 and 53 respectively mounted on fixed pivots 54 and 55 respectively. The bell cranks include long arms 56 and 57 respectively. In mesh with the gears 46 and 48 are gears 58 and 60 respectively which remain in constant mesh with the internal teeth 61 of the mounting member 20. Elongated guide gears 46 and 48 have teeth which are substantially conjugate to the teeth of the work gears 28 and hence, to the internal teeth of the hone. The teeth of the gears 46 and 48 may be relatively thin to provide appreciable backlash so that under operating conditions, the work gear is guided in tight mesh with the teeth of the hone and remains in loose mesh with the guide gears 46 and 48.

Yieldable means are provided effective to urge the work gears 28 upwardly in the illustrated embodiment of the invention into predetermined pressure contact with the teeth of the hone. This means comprises a compression spring diagrammatically indicated at 62 engaged between the head 64 of a bolt 66 and an abutment 68 on the arm 57.

The lower ends of the arms 56 and 57 of the bell cranks are engageable with an upwardly extending tooth-like projection 70 on an arm 72 pivoted by a bolt 73 to the plate 12. Carried by the plate is a solenoid 74 having a plunger provided with a member 76 connecting it to the free end of the lever or arm 72. When the plunger is drawn upwardly in the solenoid 74 the tooth 70 operates to cam the lower ends of the bell crank arms 56 and 57 apart so as to move the guide gears 46 and 48 downwardly. This has the effect of lowering a work gear 28 in mesh with the guide gears 46 and 48 into a clearance position with respect to the teeth of the hone 22.

Preferably, the mounting member 20 is provided at its interior surface with longitudinally extending teeth in alignment with the teeth on the hone 22.

At the back of the machine is a discharge chute 80 for receiving finished gears from the machine and leading them to a suitable receptacle.

At the front of the machine and in line with a work gear 28 moved from the lower end of the supply chute 24 into meshed engagement with the forwardly extending ends of the elongated guide gears 46 and 48 is an air cylinder 82 having a piston 84 therein and a pusher rod 86.

The operation of the apparatus will now be described. With the motor 30 energized and the mounting member 20 and honing tool 22 in rotation, the pusher rod 86 is retracted from beneath the lower end of the chute 24 and the lowermost gear therein drops onto the rotating elongated guide gears 46 and 48. As soon as the work gear meshes with the guide gears, as it does instantaneously, it assumes rotation in timed relation to the tool and to the internal toothed portions of the mounting member 20. At this time the solenoid 74 may be energized rocking the bell cranks 52 and 53 in a direction to lower the guide gears 46 and 48 into clearance position. Thereafter, air is admitted to the cylinder 82 and the push rod 86 pushes the work gear along the rotating guide gears into meshed engagement with the teeth of the tool. If, as preferred, the annular mounting member 20 is provided with internal teeth, the teeth of the gear first mesh with the teeth of the mounting member and are guided thereby in addition to the guiding action of the guide gears 46 and 48, into proper meshed relation with the teeth of the internally toothed tool without the possibility of end interference. The push rod 86 remains in advanced position and helps retain the work gear against axial shifting movement during the ensuing finishing operation. When the gear has reached its properly centered position with respect to the tool the solenoid 74 is de-energized and the spring 62 again becomes effective to urge the work gear upwardly under predetermined pressure into tight mesh with the teeth of the honing tool.

The actual finishing cycle may involve a predetermined interval during which the motor 30 is driven in one direction, followed by reversal of the motor and an equal interval of rotation in the opposite direction. Thereafter, air is admitted to the cylinder 82 in a direction to reverse movement of the piston therein and the push rod 86 is retracted from beneath the open end of the supply chute 24, leaving the finished work gear in mesh with the guide gears 46 and 48 and with the teeth of the honing tool 22. Thereafter, a successive work gear drops onto the laterally extending portions of the guide gears and is advanced to required position as previously described. Movement of the successive gear into finishing position pushes the previously finished gear out of the opposite side of the finishing tool where it falls into the discharge chute 80.

The means for timing the reversal of the motor 30, the forward and reverse movement of the piston 84, and the actuation of the solenoid 74 are not illustrated since any suitable timing means may be employed. However, de-energization of the solenoid 74 may be responsive to completion of forward movement of the push rod 86 and energization of the solenoid 74 may be responsive in an obvious manner to movement of the piston 84 to the left, as seen in FIGURE 2.

The apparatus illustrated in FIGURES 1–3 is shown as operable to maintain the pinion or gear 28 in contact with the internal teeth of the gear finishing tool 22 with the axes of the gear and tool parallel. This is a condition in which the operation is intended primarily to remove nicks from the teeth of the gear and is not intended to produce substantial removal of material from the flanks of the teeth.

In this connection, reference is now made to FIGURES 8–11.

Figure 8:
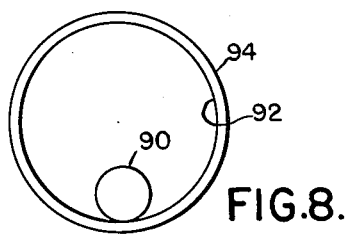
FIGURE 8 is a diagrammatic view illustrating the relationship between a cylinder internally tangent to the interior of a hollow cylinder with the axes parallel.

Referring first to FIGURE 8 there is shown an end view of a cylinder 90 tangent with the interior surface 92 of a hollow cylindrical body 94, the axes of the body 94 and the cylinder 90 being parallel to each other. In this case it will of course be understood that there exists a line of tangency between a straight line element of the cylinder 90 and a straight line element of the interior surface of the body 94. Smooth surfaced bodies are illustrated in these figures for simplicity because they are illustrative of the similar type of contact existing between toothed members such as an internal gear-like tool corresponding to the hollow cylindrical body 94 and a work gear internally meshed therewith corresponding to the cylinder 90.

Figure 9:
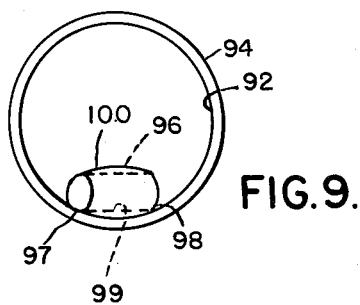
FIGURE 9 is a diagrammatic view illustrating the relationship between a slightly barrel-shaped member internally tangent at crossed axes with the interior of a hollow cylindrical body.

If a cylindrical body is positioned within the hollow cylindrical body 94 with its axes crossed, it will be appreciated that it will contact the interior surface 92 of the cylindrical body 94 at only two points. This relationship is illustrated in FIGURE 9 where the cylindrical body is shown in dot and dash lines at 96, the end portions of the cylinder being tangent to the interior surface 92 of the hollow cylindrical body 94 at end points 97 and 98 only. Intermediate the points 97 and 98 clearance exists between the surface of the cylinder 96 and the interior surface 92 of the hollow cylindrical body 94. This clearance is indicated by the separation between the dot and dash line 99 and the interior surface 92.

However, if the member within the hollow cylindrical body 94 is modified to have a barrel shape, as illustrated at 100 in FIGURE 9, then if the barrel shape is properly related to the angle in space between the axes of the barrel shaped member and the hollow cylindrical body 94, the full contact between the axially overlapped extent of the hollow cylindrical body 94 and the barrel shaped member 100 can exist.

Figures 10, 11:
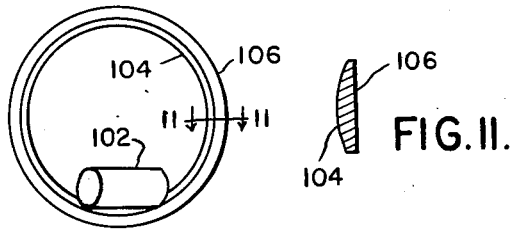
FIGURE 10 is a diagrammatic view illustrating the relationship between a cylindrical member internally tangent at crossed axes with the modified interior of a generally hollow cylindrical body.
FIGURE 11 is a sectional view on the line 11—11, FIGURE 10.

Conversely, full contact between the axially overlapping extent of an internal cylinder 102 and the interior surface 104 of a modified generally cylindrical hollow body 106 may also exist. This relationship is illustrated in FIGURES 10 and 11, and in FIGURE 11 the internal surface 104 of the generally cylindrical hollow body 106 is illustrated. The surface 104 is convex in axial section to the extent required to cause it to have continuous line contact with the external surface of the truly cylindrical member 102.

From the foregoing it will be seen that a variety of desirable results may be obtained as the situation requires. In the first place, if it is desired merely to remove nicks and effect an improvement in the sound characteristics of the hardened gear, it may be run in mesh with the internal finishing tool at parallel axes.

On the other hand, if it is desired to impart a slight crown to the work gear, this may be accomplished by running it in mesh at predetermined small crossed axes with respect to the internal gear finishing tool, the teeth of which are unmodified from end to end.

Thirdly, if it is desired to provide a finishing action adapted to remove appreciable amounts of stock substantially uniformly over the working flanks of the teeth of the hardened gear without imparting modification thereto, this may be accomplished by providing crowned teeth on the internal finishing tool.

Obviously, variations of the foregoing may be the employment of a selected crossed axes relationship in conjunction with a predetermined modification of the teeth of the tool so as to produce a desired modification of the teeth of the gear.

It may be mentioned at this time that a crowned gear is understood in the art to be a gear having teeth the sides or flanks of which are convexly shaped from end to end. This has the effect of producing centralized bearing between the teeth of mating gears and of eliminating undesirable end contact between the teeth of mating gears.

With the foregoing in mind it will be appreciated that the apparatus illustrated in FIGURES 1-3 as well as the apparatus subsequently to be described may be constructed and arranged to provide for parallel relationship between the axes of the internal gear and finishing tool as illustrated, or it may be without substantial structural modification be adapted for operation at crossed axes. As a practical matter it may be desirable to provide for relative adjustment between the work supporting and handling mechanism and the tool so as to provide for either parallel or crossed axes operation, and in addition, to provide for selection of the particular crossed axes relationship desired.

Referring now to FIGURES 4-7 there is illustrated a separate embodiment of the present invention. In this case the operation is intended to be carried out with the axes of the work gears and internal gear finishing tool vertical or substantially vertical. The machine comprises a frame 110 having a top plate 112 carrying a bracket 114 which in turn supports a magazine 116 carrying a plurality of hardened gears 118 which are to be finished by the machine.

Within the frame 110 there is mounted a gear finishing tool 120 in the form of an internal gear at least the toothed portions of which are formed of a hard resilient plastic material having abrasive particles embedded therein. Means are provided for driving the tool 120 in rotation and this means comprises a tool support 122 having an annular drive gear 124 bolted thereto and in mesh with a gear 126 connected by bevel gears 128 and 130 to a shaft 132. A motor 134, best seen in FIGURE 7, is provided which drives a gear 136 meshing simultaneously with gears 138 and 140. The gear 138 is connected to a drive shaft 142 which in turn connects to a worm 144 in meshing engagement with a worm gear 146. The worm gear 146 has teeth or similar driving elements 148 at one side thereof for a purpose which will presently appear. Similarly, the gear 140 is connected to a drive shaft 150 which in turn drives a worm 152 meshing with a worm gear 154 keyed or otherwise secured to the shaft 132. The worm gear 154 is also provided with teeth or similar driving elements 156. Keyed to the shaft 132 for sliding movement longitudinally thereof is a clutch member 158 adapted to be actuated by a lever 160 controlled by solenoids 162 and 164 so as to engage the clutch element with either of the worm gears 146 and 154. The worm and worm gear combinations are selected such that when the drive is through the worm 144 and the worm gear 146 a slow rotation is imparted to the tool 120. This condition prevails during indexing. On the other hand, when the drive is through the worm 152 and worm gear 154, the tool 120 is driven at a speed suitable for the gear finishing operation, which speed is normally not less than 500 feet per minute, pitch line velocity.

The apparatus comprises a second motor 166 driving a worm 168 meshed with a worm gear 170 carried by a shaft 172 to which is secured a driving disc 174 having a drive pin 176. Associated with the drive pin 176 are a pair of Geneva devices 178 and 180. The Geneva device 178 is connected to a shaft 182 to which at its upper end is secured a work driving plate 184, details of which are most readily apparent in FIGURE 4. As shown in this figure, the plate 184 is provided with four radially extending rectilinear slots 186 in each of which is mounted a slidable gear engaging block 188. Movement of the blocks 188 is the slots 186 is limited by suitable means such for example as a lateral extension 189 movable in a recess 190. Resilient means are provided such as the spring 192 urging the blocks 188 radially outwardly in the slots 186. The position of the blocks is in addition controlled by cam means 217 to effect the required movement thereof as will subsequently appear.

The Geneva member 180 is connected to a shaft 194 to the upper end of which is secured a gear ejecting member 196 having a plurality of recesses 198 engageable with a completed work gear at an appropriate cycle of the machine.

Disposed beneath the supply chute 116 and fixedly carried by the frame of the machine is a support plate 200 on which the work gears 118 rest. Diametrically opposite the loading station L where the supply chute 116 is located, is an unloading station U including an elevated discharge guide 202 comprising a flat plate portion 204 and a guide flange 206. Located beneath the stationary top surface of the frame, and as best illustrated in FIGURE 6, is an elevating solenoid 208 having a plunger 210 adapted when the solenoid is energized to lift a work gear 118 vertically out of the recess or slot 186 to the dotted position illustrated in FIGURE 6. It will be appreciated that in the dotted position the finished work gear 118 is in the plane of rotation of the gear ejecting member 196 and that upon index rotation thereof from the position illustrated in FIGURE 4, the finished work gear engaged by the recess 198 will be moved 90 degrees about the axis of the shaft 194. During such movement the finished work gear moves across the plate portion 204 of the gear ejector guide and may drop off the plate to a suitable discharge chute or the like.

It will be appreciated that automatic cycling of the machine requires timed indexing of the work driving plate 184 and the gear ejecting member 196. In addition, full automatic operation of the machine requires periodic energization of the solenoids 162 and 164 to change the speed of rotation of the gear finishing tool 120. In addition, the automatic operation requires properly timed energization of solenoid 208 to elevate the finished gear into the path of the ejector member 196. Properly timed relation between indexing rotation of the work drive plate 184 and the ejector member 196 is maintained because both of these members are driven from a single motor through Geneva mechanism including a single drive pin 176. The properly timed energization of the solenoids 162, 164, and 208 is accomplished by switches indicated generally at 212 actuated by cams indicated generally at 214 on a cam drum 216 fixed to the shaft 172. Thus, upon each rotation of the shaft 172, the work drive plate 184 and the ejector member 196 are each indexed 90 degrees in properly timed relation and solenoids 162, 164 and 208 are energized and de-energized in a properly timed relation.

With the foregoing in mind the complete operation of the mechanism will be briefly described. The gears 118 are supported in end-abutting relation with the lowermost gear resting on the upper surface of the fixed plate 200 as illustrated in FIGURE 5. At this time a block 188 is in position behind the gear to urge the same radially outwardly but is retained against radial outward movement by cam means 217. At this time the preceding work gear is at a working station designated W in FIGURE 4, and the gear finishing tool 120 is being driven at substantial speed to perform the gear finishing operation. When the gear finishing operation is completed and the cam drum 216 has completed 270 degrees of its rotation, solenoid 162 is energized to slow down the rotation of the tool 120 to a value appropriate for indexing. At this time the pin 176 engages the appropriate slot of the Geneva device 178 and effects a 90-degree rotation of the work drive plate 184. This carries the bottom work gear 118 from loading position L to working position W and allows the stack of gears 118 to move downwardly so that the next succeeding gear will rest upon the upper surface of the drive plate 184. The spring pressed block 188 behind the work gear moving from loading to working position is now allowed to move the gear outwardly into peripheral engagement with the tool 120. When the gear reaches working position W it is urged into pressure engagement with the teeth of the internal gear by the spring 192. Preferably, the blocks 188 are formed of an abrasive material and thus, during rotation of the work gear 118 in mesh with the teeth of the tool 120 at the working position, a finishing action is provided for the tops of the teeth. Alternatively of course, the blocks may be shaped as seen in FIGURE 6A to have a short post 221 engageable in the opening of the work gears.

At the next following indexing action the finished work gear is moved to the unloading position U where it is elevated into the plane of the discharge member 196 by appropriate energization of the solenoid 208 just prior to indexing movement of the discharge member 196.

As the work drive plate 184 is indexed, the slidable block 188 in the recess 186 approaching the loading position L is cammed backwardly to provide clearance so that as the slot or recess 186 reaches position beneath the supply chute 116, a work gear 118 will drop into the slot for subsequent operation.

The drawings and the foregoing specification constitute a description of the improved gear finishing machine in such full, clear, concise and exact terms as to enable any person skilled in the art to practice the invention, the scope of which is indicated by the appended claims.

What I claim as my invention is:

1. A gear finishing machine comprising a frame, an annular tool in the form of an internal gear having teeth substantially conjugate to the teeth of a work gear, means mounting said tool for rotation on said frame, a carrier on said frame for supporting a work gear in mesh with said tool, means for driving said tool and work gear in meshed rotation, said carrier comprising means adapted to engage and urge the work gear radially outwardly of said tool into pressure contact therewith, and resilient means connected to said carrier and urging it radially outwardly of said tool.

2. A machine as defined in claim 1 in which said carrier comprises a block adapted to have peripheral contact with the work gear.

3. A machine as defined in claim 1 in which said carrier comprises a block having a cylindrically shaped recess adapted to have peripheral contact with the work gear.

4. A machine as defined in claim 1 in which said carrier comprises a pair of elongated guide gears extending through said tool and adapted to mesh with a work gear as it is moved through said tool from one side to the other.

5. A machine as defined in claim 1 in which said carrier comprises a pair of elongated guide gears extending through said tool and adapted to mesh with a work gear as it is moved through said tool from one side to the other, means adapted to drive said elongated gears in timed relation to rotation of said tool, said timing gears being movable away from said tool to provide for movement of a work gear in mesh with said elongated gears into said tool, and resilient means urging said elongated gears toward said tool to press the work gear against the inner toothed surface of said tool.

6. A machine as defined in claim 5 comprising supply means for advancing work gears serially into mesh with said elongated gears at ends thereof located laterally from the adjacent side of said tool, and means for pushing said work gears serially along said elongated gears into working position within said tool.

7. An automatic gear honing machine comprising a frame, an annular internally toothed gear-like hone, means for rotating said hone, a pair of elongated guide gears extending through said hone from side to side, said guide gears having teeth substantially conjugate to the teeth of a work gear to be operated in mesh with said hone, means for driving said guide gears in timed relation to said hone, said guide gears being movable toward and away from the adjacent toothed portion of said hone, yieldable means urging said guide gears toward said hone to press a work gear in mesh therewith against said hone, and means for pushing a work gear in mesh with said guide gears axially into and out of mesh with said hone.

8. An automatic gear honing machine comprising a frame, an annular internally toothed gear-like hone, means for rotating said hone, a pair of elongated guide gears extending through said hone from side to side, said guide gears having teeth substantially conjugate to the teeth of a work gear to be operated in mesh with said hone, means for driving said guide gears in timed relation to said hone, said guide gears being movable toward and away from the adjacent toothed portion of said hone, yieldable means urging said guide gears toward said hone to press a work gear in mesh therewith against said hone, a loading chute positioned to deposit a gear on said guide gears at one side of said hone, a pusher movable to advance the work gear along said guide gears into mesh with said hone.

9. An automatic gear honing machine comprising a frame, an annular internally toothed gear-like hone, means for rotating said hone, a pair of elongated guide gears extending through said hone from side to side, said guide gears having teeth substantially conjugate to the teeth of a work gear to be operated in mesh with said hone, means for driving said guide gears in timed relation to said hone, said guide gears being movable toward and away from the adjacent toothed portion of said hone, yieldable means urging said guide gears toward said hone to press a work gear in mesh therewith against said hone, a loading chute positioned to deposit a work gear on said guide gears at one side of said hone, a pusher movable across the lower end of said chute to serve as a stop therefor and to advance the work gear along said guide gears into mesh with said hone.

10. An automatic gear honing machine comprising a frame, an annular internally toothed gear-like hone, means for rotating said hone, a pair of elongated guide gears extending through said hone from side to side, said guide gears having teeth substantially conjugate to the teeth of a work gear to be operated in mesh with said hone, means for driving said guide gears in timed relation to said hone, said guide gears being movable toward and away from the adjacent toothed portion of said hone, yieldable means urging said guide gears toward said hone to press a work gear in mesh therewith against said hone, means for moving said guide gears away from the adjacent toothed portions of the hone to provide clearance, means for pushing a work gear along said guide gears into the interior of said hone, said guide gears being movable thereafter to press said work gear into pressure contact with said hone.

11. In an automatic gear finishing machine, an internally toothed gear-like tool, a pair of guide gears extending across the opening in said tool, means for driving said tool and guide gears in timed relation, and means for pushing a work gear in mesh with projecting end portions of both of said guide gears along said guide gears into meshed relation with said tool.

12. In an automatic gear finishing machine, an internally toothed gear-like tool, a pair of guide gears extending across the opening in said tool, means for driving said tool and guide gears in timed relation, said guide gears being movable toward and away from an adjacent toothed portion of the tool, means for pushing a work gear in mesh with projecting end portions of both of said guide gears along said guide gears into meshed relation with said tool, and means for moving said guide gears away from said tool before movement of the work gear into meshed relation with said tool, and means for moving said guide gears toward said tool to press the work gear against the tool after it has been moved into meshed relation therewith.

13. An automatic gear honing machine comprising an internally toothed gear-like hone, a rotatable gear support located within said hone and eccentrically thereof, carriers for work gears movable on said gear support generally radially thereof, resilient means urging said carriers outwardly of said supports to press a gear carried thereby in meshed relation against the hone, means for indexing said gear support successively to advance each carrier thereon from loading to working to unloading and back to loading position, a loading chute at the loading positions, said carriers being positioned in loading position to receive a gear from said chute.

14. An automatic gear honing machine comprising an internally toothed gear-like hone, a rotatable gear support located within said hone and eccentrically thereof, carriers for work gears movable on said gear support generally radially thereof, resilient means urging said carriers outwardly of said supports to press a gear carried thereby in meshed relation against the hone, means for indexing said gear support successively to advance each carrier thereon from loading to working to unloading and back to loading position, a loading chute at the loading positions, said gear support having surfaces intermediate said carriers positioned to close the lower end of said chute, said carriers being positioned in loading position to receive a gear from said chute.

15. An automatic gear honing machine comprising an internally toothed gear-like hone, a rotatable gear support located within said hone and eccentrically thereof, carriers for work gears movable on said gear support generally radially thereof, resilient means urging said carriers outwardly of said supports to press a gear carried thereby in meshed relation against the hone, means for indexing said gear support successively to advance each carrier thereon from loading to working to unloading and back to loading position, a loading chute at the loading positions, said gear support having surfaces intermediate said carriers positioned to close the lower end of said chute, said carriers being positioned in loading position to receive a gear from said chute spaced radially inwardly from said hone, said carriers being movable toward said hone as they are moved to working position.

16. An automatic gear honing machine comprising an internally toothed gear-like hone, a rotatable gear support located within said hone and eccentrically thereof, carriers for work gears movable on said gear support generally radially thereof, resilient means urging said carriers outwardly of said supports to press a gear carried thereby in meshed relation against the hone, means for indexing said gear support successively to advance each carrier thereon from loading to working to unloading and back to loading position, a loading chute at the loading positions, said gear support having surfaces intermediate said carriers positioned to close the lower end of said chute, said carriers being positioned in loading position to receive a gear from said chute spaced radially inwardly from said hone, said carriers being movable toward said hone as they are moved to working position, said carriers being movable away from said hone as they move to unloading position.

17. A gear honing machine comprising a honing tool in the form of a gear conjugate to a work gear, means for rotating said honing tool, a work support for a work gear, means for driving a work gear on said work support in rotation in timed and tooth registering relation with respect to said tool and out of contact therewith, and means for moving the work gear while on said support generally axially of the work gear from a position of clearance into a position of full mesh with said tool, and thereafter moving said work support radially outwardly from the center of said tool to bring the work gear into tight mesh therewith.

18. A gear finishing machine comprising a tool in the form of a gear conjugate to a work gear to be finished, means for driving said tool in rotation, a work support for a work gear in a position displaced axially from the plane of the tool and spaced radially from the axis of said tool a distance corresponding to a condition of loose mesh between the work gear and tool, means for driving a work gear on said work support in timed and tooth registering relation with respect to said tool, means for first advancing said work gear along said work support axially of said tool to move said work gear into the plane of said tool and into loose mesh therewith, and means for thereafter moving said work support radially of the axis of said tool to bring the work gear into tight mesh with said tool.

19. A machine as defined in claim 18 in which said tool is in the form of an internal gear.

20. A machine as defined in claim 18 in which said work support comprises a pair of gears in mesh with the work gear.

21. A machine as defined in claim 20 in which said pair of gears is elongated and adapted to support the work gear for sliding movement longitudinally thereof.

References Cited in the file of this patent

UNITED STATES PATENTS

| | | |
|---|---|---|
| 1,017,613 | Weaver | Feb. 13, 1912 |
| 1,491,718 | Miller | Apr. 22, 1924 |
| 1,558,086 | Gustavsen | Oct. 20, 1925 |
| 1,853,354 | Hodgkins | Apr. 12, 1932 |
| 2,069,324 | Miller | Feb. 2, 1937 |
| 2,105,896 | Stubbs | Jan. 18, 1938 |